United States Patent [19]
Ohira et al.

[11] Patent Number: 5,701,159
[45] Date of Patent: Dec. 23, 1997

[54] DIGITAL IMAGE DECODING APPARATUS

[75] Inventors: Hideo Ohira; Tokumichi Murakami; Kohtaro Asai; Toshiaki Shimada, all of Tokyo, Japan

[73] Assignee: Mitsubishi Denki Kabushiki Kaisha, Tokyo, Japan

[21] Appl. No.: 715,161

[22] Filed: Sep. 17, 1996

[30] Foreign Application Priority Data

Mar. 4, 1996 [JP] Japan ............................. HEI 8-046345

[51] Int. Cl.$^6$ ....................................................... H04N 7/50
[52] U.S. Cl. ........................ 348/410; 348/404; 348/405; 348/415; 348/420; 348/421
[58] Field of Search ...................................... 348/421, 410, 348/404, 405, 412, 415, 420; H04N 7/50

[56] References Cited

U.S. PATENT DOCUMENTS 5,543,843  8/1996  Kato ......................................... 348/421

OTHER PUBLICATIONS

SGS-Thomson Microelectronics STI3500 Mpeg-2/CCIR 601 Video Decoder, Apr. 1994.

*Primary Examiner*—Howard W. Britton
*Attorney, Agent, or Firm*—Wolf, Greenfield & Sacks, P.C.

[57] ABSTRACT

Data which has been decoded by a decoding portion 101 are compressed by a compressing portion 102 and stored in a prediction/display frame memory portion 103. From the data stored in the prediction/display frame memory portion 103, any data required for decoding other frames in the decoding portion 101 are decompressed through a decompressing A portion 104 and supplied to the decoding portion 101. Alternatively, data to be displayed is read from the prediction/display frame memory portion 103, decompressed at a decompressing B portion 105 and supplied to a display apparatus. Writing to and reading from the above-mentioned prediction/display frame memory portion 103 is controlled by an address controlling portion 106. Since compressed data are stored in the prediction/display frame memory portion 103, the memory capacity can be decreased.

12 Claims, 14 Drawing Sheets $$A = \begin{bmatrix} 1 & 1 & 1 & 1 & 1 & 1 & 1 & 1 \\ 1 & 1 & 1 & 1 & -1 & -1 & -1 & -1 \\ 2 & 2 & -2 & -2 & 0 & 0 & 0 & 0 \\ 0 & 0 & 0 & 0 & 2 & 2 & -2 & -2 \\ 2 & -2 & 0 & 0 & 0 & 0 & 0 & 0 \\ 0 & 0 & 2 & -2 & 0 & 0 & 0 & 0 \\ 0 & 0 & 0 & 0 & 2 & -2 & 0 & 0 \\ 0 & 0 & 0 & 0 & 0 & 0 & 2 & -2 \end{bmatrix}$$

Fig. 8

EXAMPLE OF HUFFMAN CODING

| DIFFERENTIAL VALUE | WORD-LENGTH | CODE |
|---|---|---|
| -11 or UNDER | 11 | 11+DIFFERENTIAL DATA (9 bits) |
| -10 | 10 | 0000 0100 11 |
| -9 | 10 | 0000 0101 01 |
| -8 | 10 | 0000 0101 11 |
| -7 | 8 | 0000 0111 |
| -6 | 8 | 0000 1001 |
| -5 | 8 | 0000 1011 |
| -4 | 7 | 0000 111 |
| -3 | 5 | 0001 1 |
| -2 | 4 | 0011 |
| -1 | 3 | 011 |
| 0 | 2 | 10 |
| 1 | 3 | 010 |
| 2 | 4 | 0010 |
| 3 | 5 | 0001 0 |
| 4 | 7 | 0000 110 |
| 5 | 8 | 0000 1010 |
| 6 | 8 | 0000 1000 |
| 7 | 8 | 0000 0110 |
| 8 | 10 | 0000 0101 10 |
| 9 | 10 | 0000 0101 00 |
| 10 | 10 | 0000 0100 10 |
| 11 or OVER | 11 | 11+DIFFERENTIAL DATA (9 bits) |

Fig. 12

DIGITAL IMAGE DECODING APPARATUS

BACKGROUND OF THE INVENTION

1. Field of the Invention

The present invention relates generally to a digital image decoding apparatus and more particularly to a digital image decoding system used in digital CATV and digital broadcasting systems.

2. Description of the Prior Art

FIGS. 15 and 16 show an LSI block diagram and an external memory map based on those described in the manual for SGS-Thomson Microelectronics image processing LSI "STi3500 (trade name)".

As FIG. 15 shows, a FIFO memory 502, a start code detection portion 503, a memory I/O unit 504, a variable-length decoding portion 505, a decoding processing portion 506 and a display processing portion 507 are connected through data lines 552 to a microcomputer bus 551 and the microcomputer bus 551 is connected to a microcomputer interface 501 through an interface line 550. The FIFO memory 502, start code detection portion 503, memory I/O unit 504, variable-length decoding portion 505, decoding processing portion 506 and display processing portion 507 are also connected through data lines 553 to an external memory bus 554 and the external memory bus is connected to an eternal memory 508.

As FIG. 16 shows, the external memory 508 has a bit buffer region 601, an on-screen display (hereinafter OSD) region 602, a first prediction frame memory region 603, a second prediction frame memory region 604 and a display frame memory region 605.

Coded data which has accumulated in the bit buffer region 601 of the external memory 508 is first sent to the start code detection portion 503 through the external memory bus 554. When the start code detection portion 503 detects a start code, the coded data which follows the start code is sent through the FIFO memory 502 to the variable-length decoding portion 505, where variable-length decoding is carried out. Then, image decoding is carried out at the decoding processing portion 506 and a decoded image is written into the external memory 508 through the memory I/O unit 504.

The external memory 508 uses the first prediction frame memory region 603, second prediction frame memory region 604 and display frame memory region 605 to store the decoded image. In particular, image data for use in the prediction of other frames is written either in the first prediction frame memory region 603 or the second prediction frame memory region 604, and data for display use only is written in the display frame memory region 605.

The data written in the display frame memory region 605 are read in synchronization with a horizontal synchronization signal such as a television picture and output through the external memory bus 554 to the display processing portion 507.

Display data for character data and the like are stored in the OSD region 602 within the external memory 508, and similar to the data in the display frame memory region 605, are accessed when required and supplied through the external memory bus 554 to the display processing portion 507. In the display processing portion 507, if the data from the OSD region 602 are valid, they are overlaid on the data from the display frame memory region 605 and are output to a display (not shown).

Thus a display picture is obtained based on the data stored in the external memory 508.

In the above conventional digital image decoding apparatus all data required when decoding must be stored in the external memory 508. In the case of data which has been inter-frame coded, in order to decode the image data of the relevant frame all the data of the other frames used in the decoding of the relevant frame must also be stored.

This has led to the problem that, because storage of an enormous quantity of data is required for decoding, both the capacity of the external memory 508 and the amount of hardware required for implementation are very large.

SUMMARY OF THE INVENTION

It is therefore the object of the present invention to eliminate the problems described above by providing a digital image decoding apparatus which reduces the amount of hardware required by moderating the amount of memory required.

(1) A first digital image decoding apparatus of the present invention includes a decoding means for decoding, into block units, image coded data which has been inter-frame coded to obtain decoded data, a compressing means for compressing the decoded data to obtain block unit compressed data, a prediction frame memory means for retaining at least one image frame of the block unit compressed data, a decompressing means for reading and decompressing the compressed data which has been retained by the prediction frame memory means for use with the decoding means, and an address controlling means for controlling the reading and writing of compressed data to and from the prediction frame memory means.

In this configuration, data which have been decoded by the decoding means are compressed by the compressing means. Therefore the data which is stored in the prediction frame memory means is data which have been compressed by the compressing means. Consequently, a smaller capacity prediction frame memory means is sufficient. Moreover, since the capacity of the prediction frame memory means can be reduced, the data range for addressing, reading or writing is also reduced and the entire apparatus can be scaled-down. Thus, the hardware configuration of the digital image decoding apparatus is simplified, processing can be accomplished at higher speed, and the processing of moving image data can be more efficiently carried out.

(2) In another digital image decoding apparatus of the present invention, the apparatus described in above-mentioned item (1) also has a display frame memory means for retaining at least one image frame of the block unit compressed data obtained by the compressing means which is to be used for display only.

In this configuration, as with the prediction frame memory means, the capacity of the display frame memory means can be reduced and the entire apparatus can be scaled-down. Thus the hardware configuration of the digital image decoding apparatus is simplified, processing can be accomplished at higher speed and the processing of moving image data can be more efficiently carried out.

(3) In another digital image decoding apparatus of the present invention, the apparatus described in above-mentioned item (1) is configured such that the compressing means deems one of the pixels which constitute the block as a standard pixel and first quantizes the data of the standard pixel, and then quantizes pixels other than the standard pixel based on the differences of the coded data of positionally adjoining pixels.

In this configuration, quantizing of the differences of the coded data of positionally adjoining pixels other than the standard pixel is carried out. Since the data for adjoining pixels usually do not differ greatly, even if the number of bits used when quantizing the differences of the coded data is reduced, any image deterioration resulting from this compression will not be extensive. Therefore compression can be carried out with little deterioration.

(4) In another digital image decoding apparatus of the present invention, the apparatus described in above-mentioned item (1) is configured such that the compressing means deems one standard pixel in each pixel row quantizes of the block, and first the data of the standard pixel, and then quantizes pixels other than the standard pixel based on the differences of the coded data of adjoining pixels within the pixel row to which the pixels belong.

In this configuration, quantizing of the differences of the coded data of adjoining pixels other than the standard pixel is carried out. Since the data for adjoining pixels usually do not differ greatly, even if the number of bits used when quantizing the differences of the coded data is reduced, any image deterioration resulting from this compression will not be extensive. Therefore compression can be carried out with little deterioration.

(5) In another digital image decoding apparatus of the present invention, the apparatus described in above-mentioned item (1) is configured such that the compressing means allocates a small amount of information to a high frequency signal and allocates a large amount of information to a low frequency signal when compressing.

In this configuration, by allocating a large amount of information to a low frequency signal, which has a large degree of influence on image quality, and allocating a small amount of information to a high frequency signal, which has a minor influence on image quality, an image can be compressed with little deterioration. Thus compression can be carried out with little image deterioration.

(6) In another digital image decoding apparatus of the present invention, the apparatus described in above-mentioned item (1) also includes a block data amount controlling means which controls the compressing rate so that the data amount of each block compressed by the compressing means will be less than a predetermined data amount.

In this configuration, the compressing rate can be altered in accordance with the image information and any deterioration in image quality can be limited. For instance, provided that the amount of information after compressing is less than the predetermined data amount, compressing processing is carried out using a method with little image deterioration. Compressing processing using a method which can cause higher image deterioration is used only in cases in which the predetermined value is exceeded. Consequently, the overall deterioration in image quality can be limited when compared to cases where a single ordinary compression method is used.

(7) In another digital image decoding apparatus of the present invention, the compressing means and the block data amount controlling means of the apparatus described in item (6) are configured as described below.

The compressing means compresses the data of each block both by: a first compressing method in which one of the pixels which constitute the block is deemed a standard pixel and the data of pixels other than the standard pixel are expressed as differences of the coded data between adjoining pixels, and a short word-length is allocated for these differences of the coded data when the differences are close to zero and a long word-length is allocated for the differences which are larger; and by a second compressing method in which one of the pixels which constitute the block is deemed a standard pixel and first the data of the standard pixel is quantized, and then the data of pixels other than the standard pixel are quantized, with a predetermined quantization bit number, based on the differences of the coded data of adjoining pixels.

Moreover, if the data amount of the data which have been compressed by the first compressing method of the compressing means is less than a predetermined value, the block data amount controlling means sends an instruction to the compressing means to output the data resulting from the first compressing method, and, if the data amount of the data which have been compressed by the first compressing method is greater than the predetermined value, the block data amount controlling means chooses a quantization bit number to ensure that the data amount will be less than the predetermined value, and sends an instruction to the compressing means to compress the data resulting from the second compressing method using the chosen quantization bit number.

In this configuration, using the first compressing method there is little image deterioration and only minimal compressing is carried out, and using the second compressing method there is greater image deterioration but compressing can be carried out precisely. As such, it is possible to use the method which is appropriate to the image which is to be compressed. In addition, in the second compressing method, since the quantization bit number allocated to the differences of the coded data can also be controlled as appropriate, the compressing rate can be even further suitably altered. Thus by controlling the compressing rate to be appropriate for the image information which is to be compressed, even when using a memory with a comparatively small capacity, compression can be carried out with little image deterioration.

(8) In another digital image decoding apparatus of the present invention, the compressing means and the block data amount controlling means of the apparatus described in item (6) are configured as described below.

The compressing means compresses the data of each block both by: a first compressing method in which one of the pixels which constitute the block is deemed a standard pixel and the data of pixels other than the standard pixel are expressed as differences of the coded data between adjoining pixels, and a short word-length is allocated for the differences of the coded data when the differences are close to zero and a long word-length is allocated for the differences which are larger; and by a second compressing method in which one pixel in each of the pixel rows of the block is deemed a standard pixel and first the data of the standard pixel is quantized, and then the data of pixels other than the standard pixel are quantized, with a predetermined quantization bit number, based on the differences of the coded data of adjoining pixels within the pixel row to which the pixel belongs.

Moreover, if the data amount of the data which have been compressed by the first compressing method of the compressing means is less than the predetermined value, the block data amount controlling means sends an instruction to the compressing means to output the data resulting from the first compressing method, and, if the data amount of the data which have been compressed by the first compressing method is greater than the predetermined value, the block data amount controlling means chooses a quantization bit number to ensure that the data amount will be less than the predetermined value, and sends an instruction to the compressing means to compress the data resulting from the second compressing method using the chosen quantization bit number.

In this configuration, using the first compressing method there is little image deterioration and only minimal compressing is carried out, and using the second compressing method there is greater image deterioration but compressing can be carried out precisely. As such, it is possible to use the method which is appropriate to the image which is to be compressed. In addition, in the second compressing method, since the quantization bit number allocated to the differences of the coded data can also be controlled as appropriate, the compressing rate can be even further suitably altered. Thus by controlling the compressing rate to be appropriate for the image information which is to be compressed, even when using a memory with a comparatively small capacity, compressing can be carried out with little image deterioration.

(9) In another digital image decoding apparatus of the present invention, the apparatus described in item (1) also includes a frame data amount controlling means which controls the compressing rate to ensure that the data amount compressed by the compressing means is less than a predetermined image frame data amount.

In this configuration, the compressing rate can be altered in accordance with the image information and any deterioration in image quality can be limited. For instance, provided that the amount of information after compressing is less than the predetermined data amount, compressing processing is carried out using a method with little image deterioration. Compressing processing using a method which can cause higher image deterioration is used only in cases in which the predetermined value is exceeded. Consequently, the overall deterioration in image quality can be limited when compared to cases where an ordinary method is used.

(10) In another digital image decoding apparatus of the present invention, the frame data amount controlling means of the apparatus described in item (9) compares the total data amount prior to a predetermined time during the compression operation of one image frame with a standard data amount at the predetermined time and if the total data amount has exceeded the standard data amount, sets the maximum permitted data amount value of each block in the subsequent compressing to a lower value, and, if the total data amount is less than the standard data amount sets the maximum permitted data amount value of each block in the subsequent compressing to a higher value.

In this configuration, the compressing rate can be altered in accordance with the image information and any deterioration in image quality can be limited. In particular, in a case where initially the data amount is large and a large memory region would be used, by further compression the data amount of each frame can be limited to a designated amount. Alternatively, in a case where initially the data amount is small and a small region of memory would be used, image deterioration can be reduced by only compressing a little.

(11) In another digital image decoding apparatus of the present invention, the frame data amount controlling means of the apparatus described in item (10) also includes a block data amount controlling means which controls the compressing rate to ensure that the data amount of each block compressed by the compressing means is less than a predetermined data amount, wherein the compressing means and the frame data amount controlling means are configured as described below.

The compressing means compresses the data of each block both by: a first compressing method in which one of the pixels which constitute the block is deemed a standard pixel and the data of pixels other than the standard pixel are expressed as differences of the coded data between adjoining pixels, and a short word-length is allocated for the differences of the coded data when the differences are close to zero and a long word-length is allocated for the differences which are larger; and by a second compressing method in which one pixel in each of the pixel rows of the block is deemed a standard pixel and first the data of the standard pixel is quantized, and then the data of pixels other than the standard pixel are quantized, with a predetermined quantization bit number, based on the differences of the coded data of adjoining pixels within the pixel row to which the pixel belongs.

Moreover, if the data amount of the data which have been compressed by the first compressing method of the compressing means is less than the maximum permitted value set by the frame data amount controlling means, the block data amount controlling means sends an instruction to the compressing means to output the data resulting from the first compressing method, and, if the data amount of the data which have been compressed by the first compressing method is greater than the set maximum permitted value, the block data amount controlling means chooses a quantization bit number to ensure that the data amount will be less than the set maximum permitted value, and sends an instruction to the compressing means to compress the data resulting from the second compressing method using the chosen quantization bit number.

In this configuration, the compressing rate can be altered in accordance with the image information and any deterioration in image quality can be limited. In particular, in a case where initially the data amount is large and a large memory region would be used, by further compression the data amount of each frame can be limited to a designated amount. Alternatively, in a case where initially the data amount is small and a small region of memory would be used, image deterioration can be reduced by only compressing a little.

Moreover, in the compressing of individual blocks, the first compressing method, in which there is little image deterioration and only minimal compressing is carried out, and the second compressing method, in which there is higher image deterioration but more precise compressing, can be used as appropriate to the block which is to be compressed. In addition, in the second compressing method, since the quantization bit number can also be adjustably controlled the compressing rate can be even more suitably controlled. Thus, by controlling the compressing rate as appropriate to the image information which is to be compressed, even when using a memory with a comparatively small capacity, compressing can be carried out with little image deterioration.

(12) In another digital image decoding apparatus of the present invention, the apparatus described in item (10) also includes a block data amount controlling means which controls the compressing rate to ensure that the data amount of each block compressed by the compressing means is less than a predetermined data amount, and the compressing means and the frame data amount controlling means are configured as described below.

The compressing means compresses the data of each block both by: a first compressing method in which one of the pixels which constitute the block is deemed a standard pixel and the data of pixels other than the standard pixel are expressed as differential coded data between adjoining pixels, and a short word-length is allocated for these differences of the coded data when the differences are close to zero and a long word-length is allocated for the differences which are larger; and by a second compressing method in which one pixel in each of the pixel rows of the block is deemed a standard pixel and first the data of the standard pixel is quantized, and then the data of pixels other than the standard pixel are quantized, with a predetermined quantization bit number, based on the differences of the coded data of adjoining pixels within the pixel row to which the pixel belongs.

Moreover, if the data amount of the data which have been compressed by the first compressing method of the compressing means is less than the maximum permitted value set by the frame data amount controlling means, the block data amount controlling means sends an instruction to the compressing means to output the data resulting from the first compressing method, and, if the data amount of the data which have been compressed by the first compressing method is greater than the set maximum permitted value, the block data amount controlling means chooses a quantization bit number to ensure that the data amount will be less than the set maximum permitted value, and sends an instruction to the compressing means to compress the data resulting from the second compressing method using the chosen quantization bit number.

In this configuration, the compressing rate can be altered in accordance with the image information and any deterioration in image quality can be limited. In particular, in a case where initially the data amount is large and a large memory region would be used, by further compression the data amount of each frame can be limited to a designated amount. Alternatively, in a case where initially the data amount is small and a small region of memory would be used, image deterioration can be reduced by only compressing a little.

Moreover, with a first compressing method in which there is little image deterioration and only minimal compressing is carried out, and a second compressing method wherein there is higher image deterioration but compressing can be precisely carried out, these two methods can be used as appropriate for the image which is to be compressed. In addition, in the second compressing method, since the quantization bit number can also be adjustably controlled the compressing rate can be even more suitably controlled. Thus, by controlling the compressing rate as appropriate to the image information which is to be compressed, even when using a memory with a comparatively small capacity, compressing can be carried out with little image deterioration.

BRIEF DESCRIPTION OF THE DRAWINGS

FIG. 8 is a diagram depicting a matrix displaying a Harr conversion used in the conversion processing.

FIG. 12 is a diagram showing an example of Huffman coding in the second embodiment.

DESCRIPTION OF THE PREFERRED EMBODIMENTS

The preferred embodiments of the present invention will be described with reference to the diagrams.

Embodiment 1

Figure 1:
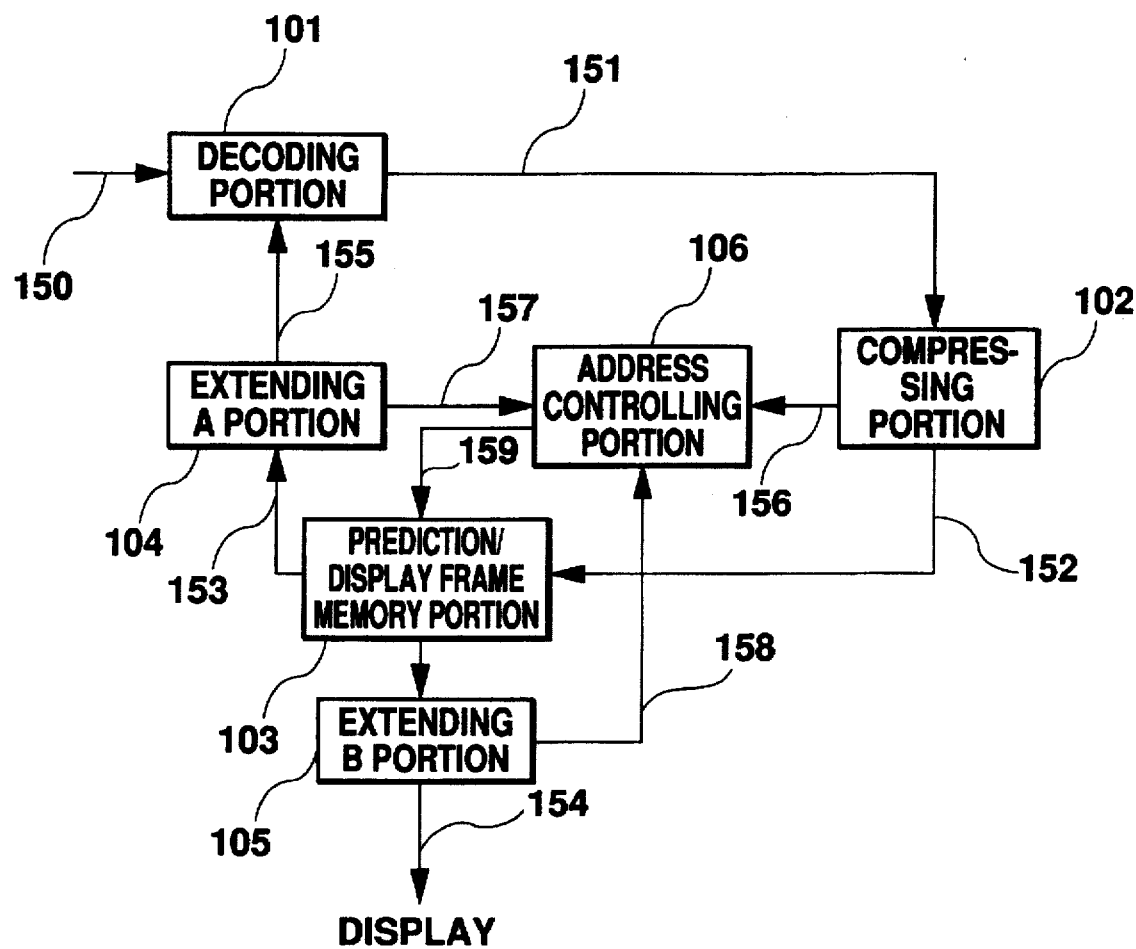
FIG. 1 is a block diagram showing a general configuration of the present invention in a first embodiment.

FIG. 1 is a block diagram showing a general configuration of a first embodiment of the invention. A decoding portion 101 uses decompressed data 155 as prediction data to decode coded data 150 which has been externally supplied. The decoded data 151 obtained as a result of the decoding are compressed at a compressing portion 102 and the data amount is also compressed. The compressed data 152 obtained as a result of the compressing are then written in a prediction/display frame memory 103.

Figure 2:
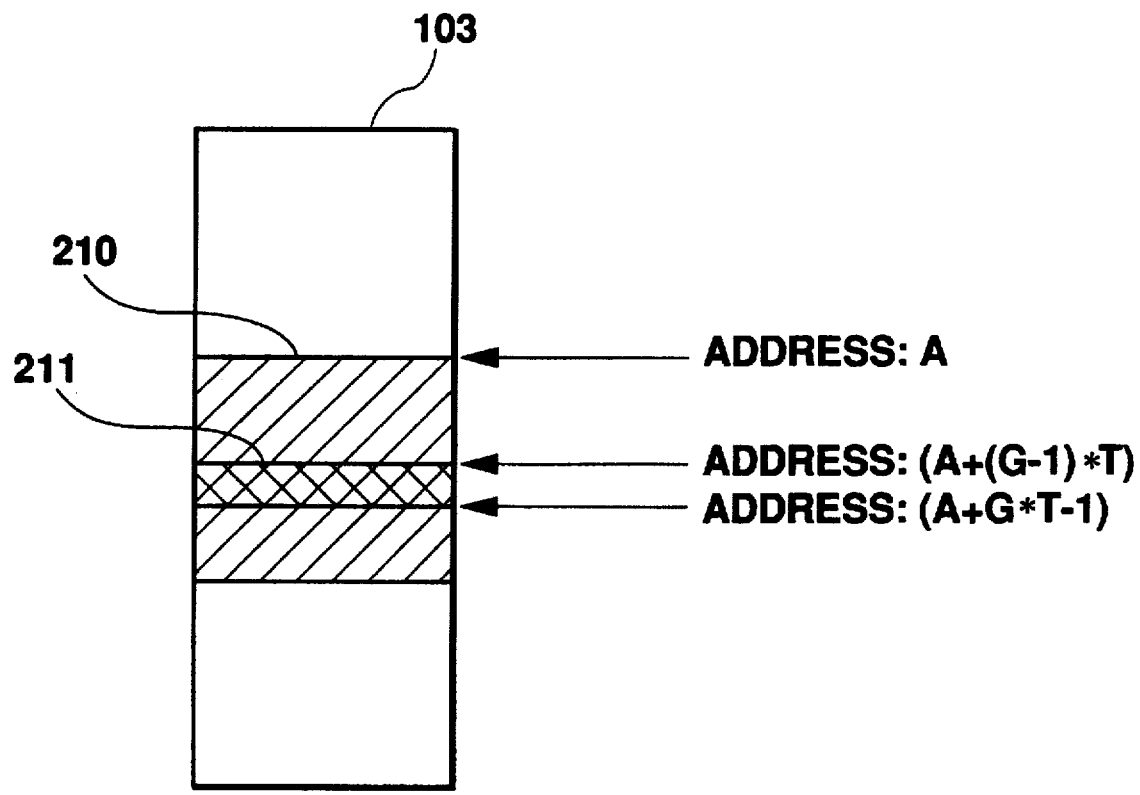
FIG. 2 is a diagram depicting an address within a prediction and display frame memory portion in the first embodiment.

An address controlling portion 106 controls the prediction/display frame memory portion 103 input and output and creates frame memory addresses such that the data will be written into address positions corresponding to each of the blocks into which each image frame is divided. The address controlling portion 106 sends frame memory addresses through an address line 159 to the prediction/display frame memory portion 103. For instance, if the first address in a compressed image frame is A and the data amount generated in 1 block is T bits, then the writing position of a Gth block will be from (A+(G−1)*T) to (A+G*T−1). The configuration of the prediction/display frame memory 103 is shown in FIG. 2. The writing position of a frame 210 is shown by diagonal lines and double diagonal lines and the writing position of a Gth block 211 within this frame is shown by the double diagonal lines. The address controlling portion 106 is also connected to the compressing portion 102, a decompressing A portion 104 and a decompressing B portion 105 by control lines 156, 157, and 158 respectively.

In order to display an image, compressed data are read in raster sequence, decompressed at the decompressing B portion 105, and sent as display data 154 to a display.

The decompressing A portion 104 accesses the prediction/display frame memory portion 103 to obtain compressed data 153, then decompresses the compressed data 153, and sends it as decompressed data 155 (prediction data) to the decoding portion 101.

When data are read from the prediction/display frame memory portion 103, the address controlling portion 106 controls addresses in the same way as the above described storage of compressed data in the prediction/display frame memory portion 103.

In this configuration, the prediction/display frame memory portion 103 can be configured with a smaller capacity than the data amount of the target image data because the stored data is compressed.

Figure 3:
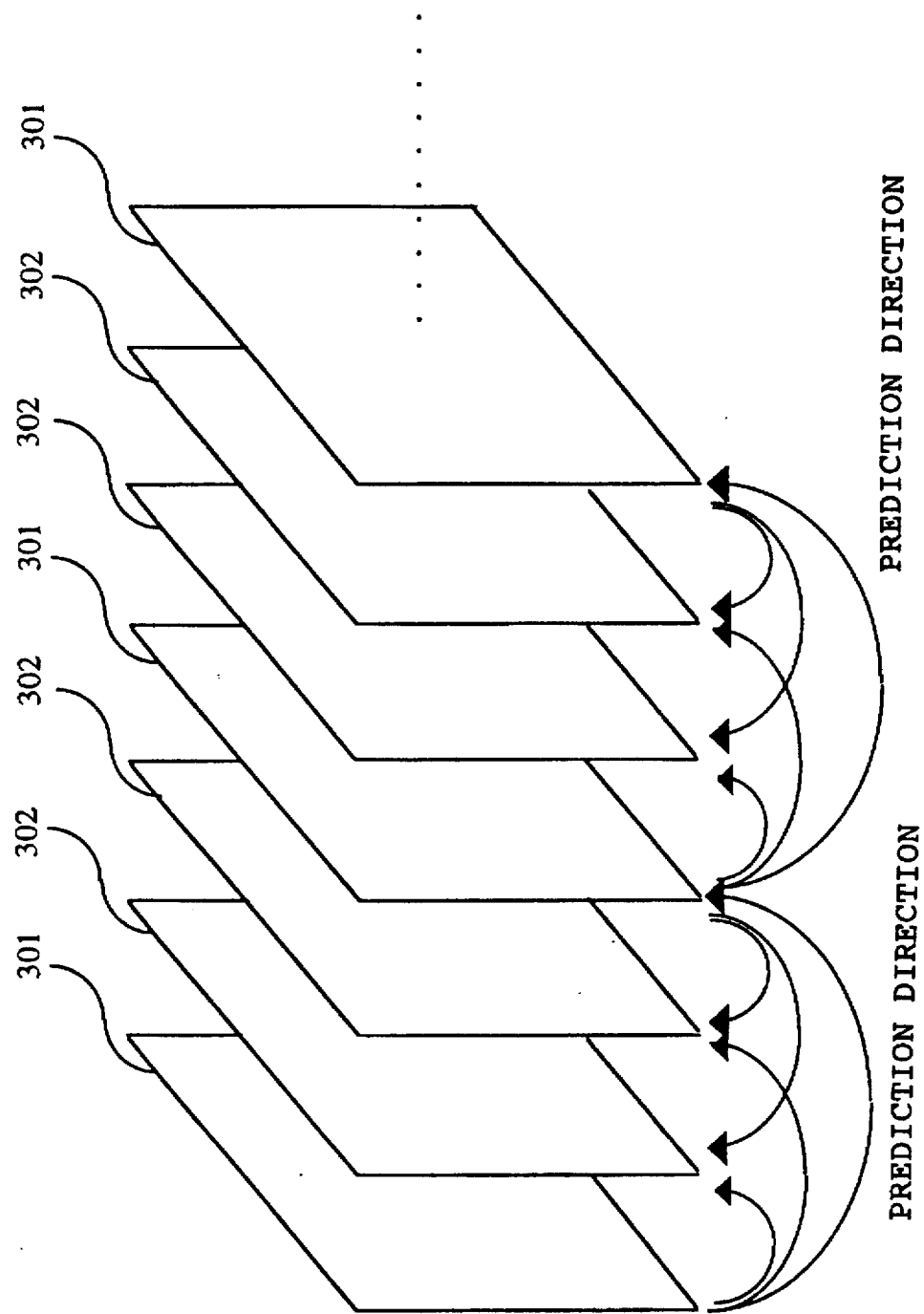
FIG. 3 is a diagram showing the classification of image frames.
Figure 4:
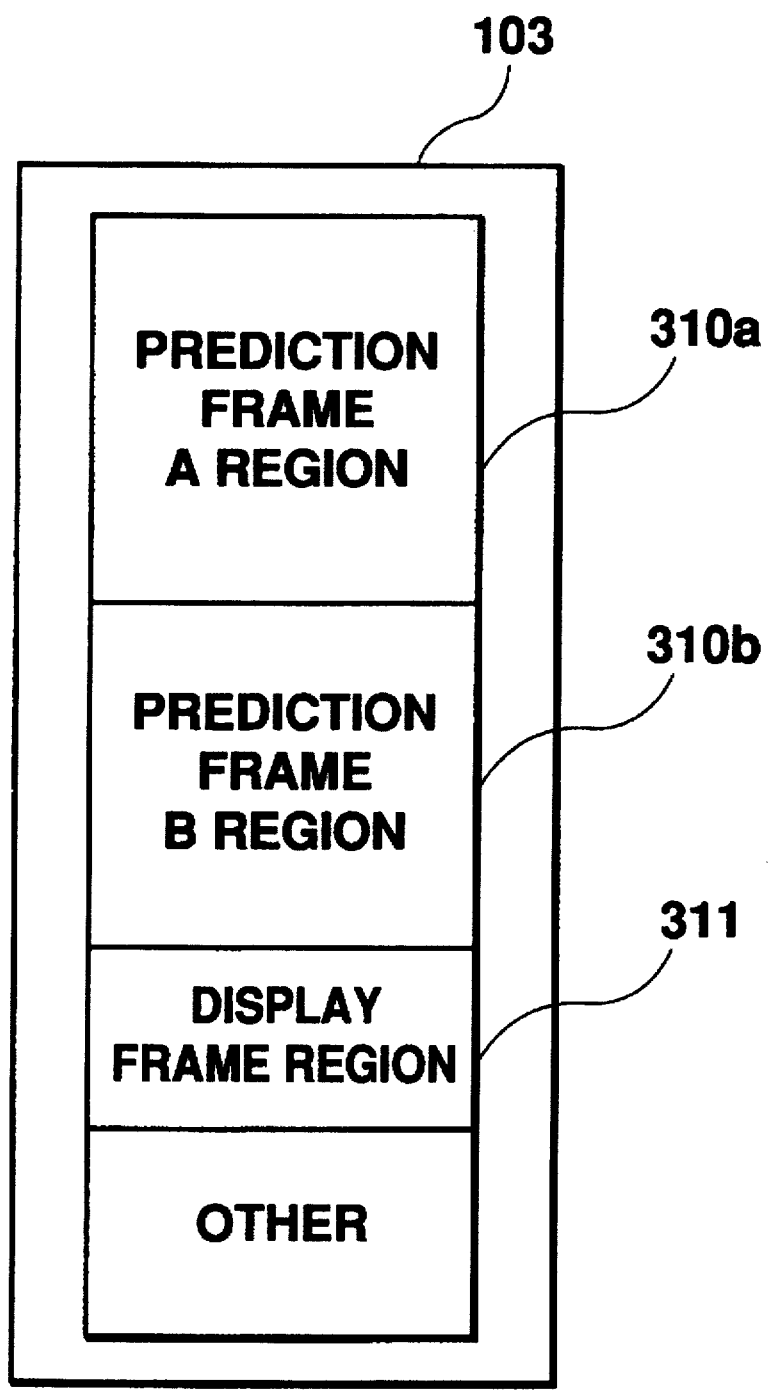
FIG. 4 is a diagram depicting a bit map of the prediction and display frame memory portion in the first embodiment.

FIG. 3 is a diagram showing the relation between display frames and prediction frames when coded image data is decoded. FIG. 4 shows the configuration of the memory regions of the prediction/display frame memory portion 103.

Prediction frames 301 are stored in a prediction frame region 310 and are used in both the decoding of other prediction frames and in the decoding of display frames 302. The display frames 302 are stored in a display frame memory region 311 and are used only for display.

Figure 5:
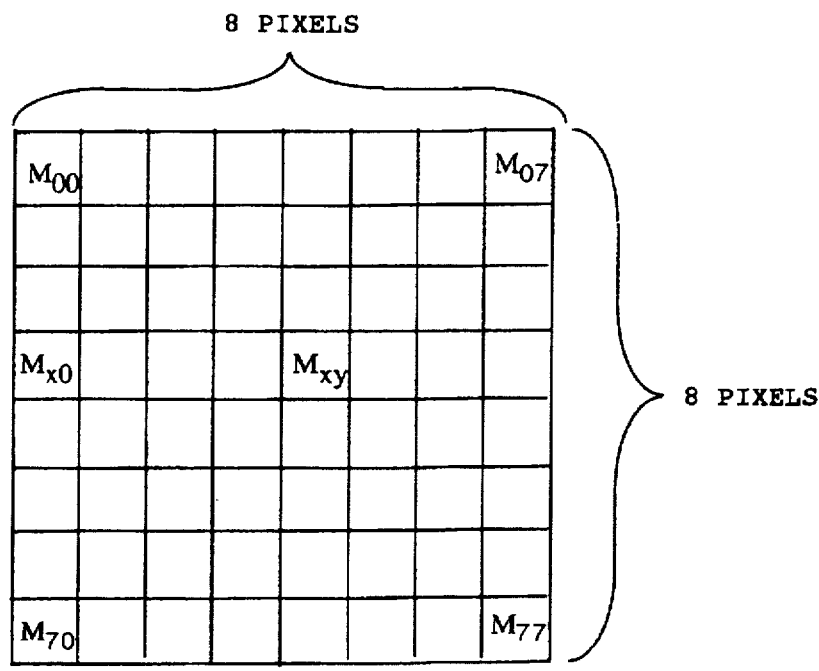
FIG. 5 is a diagram showing a pixel configuration of 1 image block.
Figure 6:
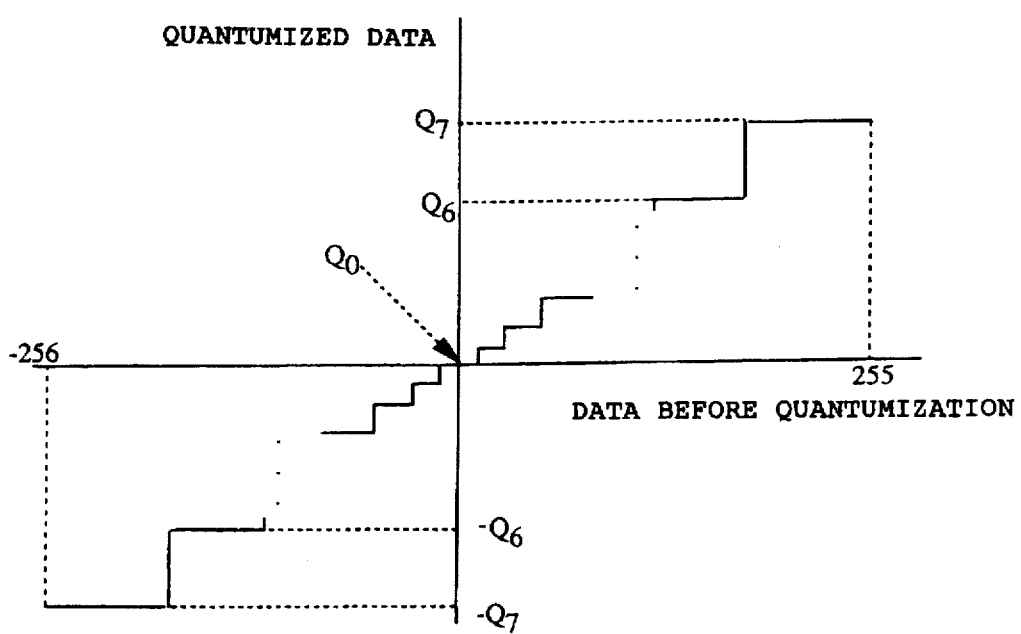
FIG. 6 is a diagram explaining the quantumization processing of differential coded data in the first embodiment.

Next, quantizing processing in the present embodiment will be described with reference to FIGS. 5 and 6. FIG. 5 shows a block, which is one portion of one image frame, comprising 8*8 pixels. The data for each pixel are identified by a code $M_{xy}$ where x is the vertical sequential order and y is the horizontal sequential order. As the diagram shows, the upper left pixel is $M_{00}$ and the bottom right pixel is $M_{77}$.

In quantization, one of the pixels in this block, for instance pixel $M_{00}$, is used as a standard pixel, and for this standard pixel $M_{00}$, the uncompressed data is used as it is. The other pixels in the block are quantized using the differences of the coded data of adjoining pixels. For instance, for the pixel $M_{x0}$ in the (y=0) left end column, quantizing is carried out based on $$M'_{x0}=Q[M_{x0}-M_{(x-1)0}] \quad (1)$$

while for pixels $M_{xy}$ other than those above, (i.e. y≠0), quantizing is carried out based on $$M'_{xy}=Q[M_{xy}-M_{x(y-1)}] \quad (2)$$

$M'_{xy}$ indicates the data in a pixel after quantizing and Q [ ] indicates the quantizing process.

For instance, if the data for each pixel before quantizing is 8 bits, then the differential data are indicated by 9 bits (−256~255). If these are quantized with for instance 4 bits, a typical quantizing value of less than 16 can be used. In addition, since the differential of adjoining pixels is usually close to zero, it is acceptable to carry out non-linear quantizing as shown in FIG. 6 whereby the quantizing range is decreased when the differential is around zero and increased as the differential departs from zero.

According to this type of quantizing, by storing the standard pixel $M_{00}$ with 8 bits and other pixels with 4 bits, the quantizing data amount becomes (data amount after compression)=8+4*(8*8−1)=260 bits (3)

while the data amount before compression is (data amount before compression)=8*8*8=512 bits (4)

thus the compression rate (data amount before compression−data amount after compression/data amount before compression) is approximately 50%.

Quantizing processing can also be carried out by further subdividing the block, selecting one pixel within each of the resulting small blocks as a standard pixel, and then calculating differential data for the remaining pixels within the small blocks which can then be quantumized.

For instance, one line of the block shown in FIG. 5 can be predetermined as the small block, and the pixel on the far left of each small block can be designated as the standard pixel. In other words, pixel $M_{x0}$ becomes a standard pixel and its data prior to compression are used as they are. For the other pixels, that is, for pixels where y≠0, quantizing is carried out based on equation (2) described above. Moreover, with regard to the quantizing range, it is acceptable to carry out non-liner quantizing as shown in FIG. 6.

As in the above-mentioned case, if quantizing is carried out with 8 bits for data prior to compression and 4 bits for differentials of adjoining data, for a block of 8*8 pixels the data amount after compression becomes (data amount after compression)=8*((8+4*(8−1))=288 bits (5)

Thus the compressing rate is approximately 50%.

The above compression method used a pixel on the upper left or far left as the standard, but it is not restricted to these pixels. As a further example, a block can also be further subdivided at each line or each column, for instance a block of 4*4 pixels can be divided into 4 sections.

Moreover, the above describes an example wherein 4-bit quantizing is used for an 8*8 pixel block, but the block size and quantizing bit number can also be chosen as deemed appropriate.

Figure 7:
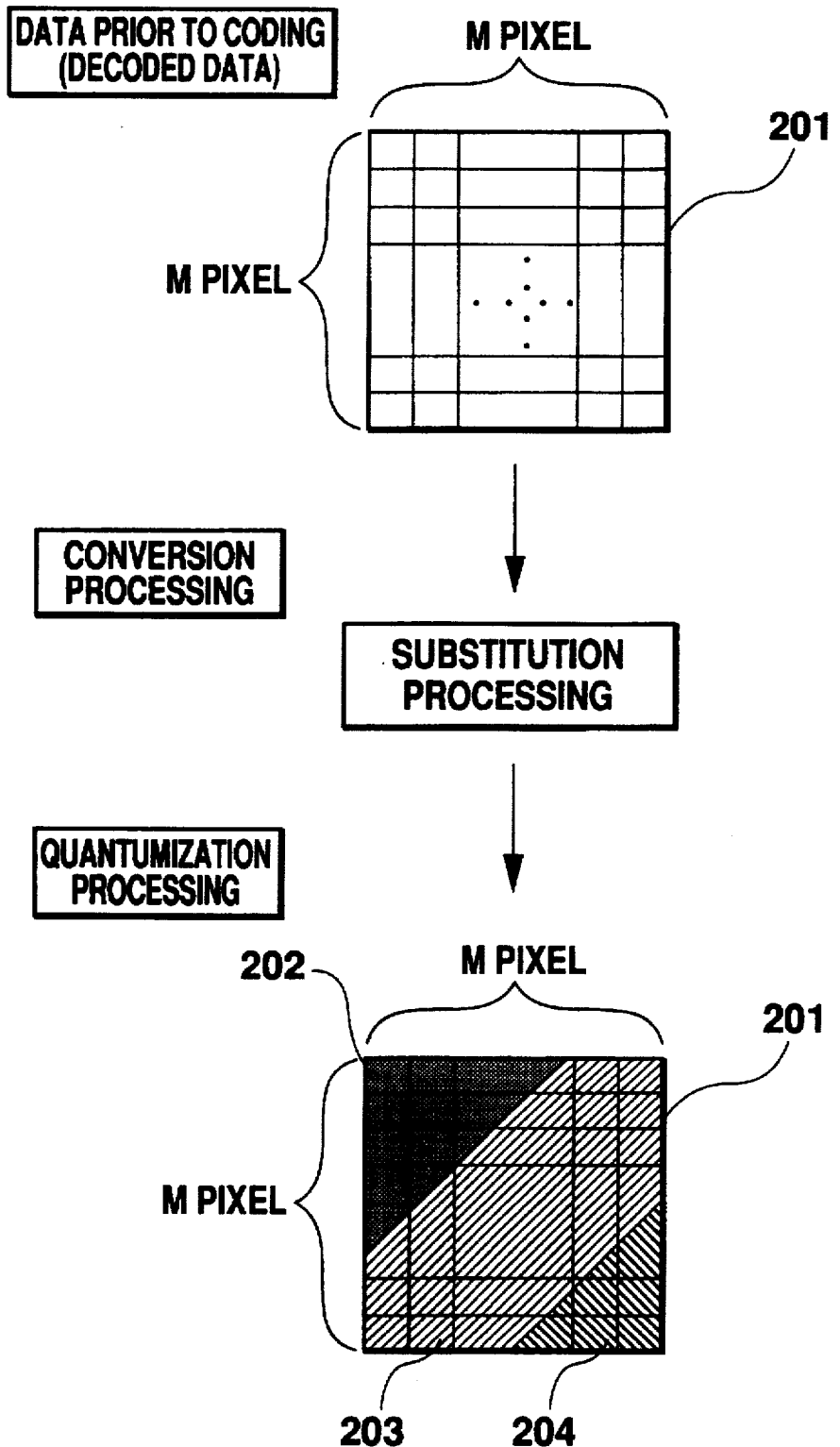
FIG. 7 is a diagram depicting an example of compressing processing in the first embodiment.

In FIG. 7 a summary of the sequence of another type of compressing process is shown. The decoded block data undergo a predetermined conversion process at the decoding portion 101 shown in FIG. 1. In FIG. 7 a block 201 of M*M pixels is taken as an example. If every pixel is displayed with t bits, the data amount in the block is M*M*t. By undergoing a conversion process such as a discrete cos conversion, the data in the M*M pixels is divided such that: the upper left portion is a low frequency signal, the central portion is a middle frequency signal, and the bottom right portion is a high frequency signal.

In the processing at the compressing portion 102 (shown in FIG. 1) conversion processing is carried out on the block 201 of M*M pixel units in compliance with the characteristics of the image, and after conversion the block is divided into a low frequency signal region 202, a middle frequency signal region 203, and a high frequency signal region 204. The number of pixels in the low frequency signal, the middle frequency signal and the high frequency signal are assigned as r1, r2, r3, and the bit number division allocations for each signal are s1, s2, s3 (bits/pixels). However, s1>s2>s3, and r1+r2+r3=M*M. Because more bits are assigned to the low frequency signal region there is less effect on the image quality. Consequently the effect on the image is diminished and better compression of the data amount is accomplished.

By assigning bit numbers in this way and then carrying out quantumization, the data amount in the block becomes (data amount after compression) $T=r1*s1+r2*s2+r3*s3$ (6)

Moreover, this data amount is normally constant.

FIG. 8 shows a matrix A for a Harr conversion which can be used in the conversion processing in FIG. 7. This matrix A is a coefficient matrix for converting an 8*8 pixel block.

If the image of a block prior to one-dimensional Harr conversion is X and the image of the block after conversion is B, then $$B=AX \quad (7)$$

and when B is quantized and the image of the block after compression is B' then the decompressed block Y obtained by decompressing this is $$Y=A^{-1}B' \quad (8)$$

and compression and decompression can be carried out according to this method.

In this process, since reduction of the bit numbers is carried out after quantizing, the conversion is non-reversible. Furthermore, although Harr conversion was used in the example shown above, other equations are acceptable provided that the signals for each frequency region can be separated. Moreover, the conversion process is not restricted to using a low frequency signal, a middle frequency signal and a high frequency signal.

Embodiment 2

Figure 9:
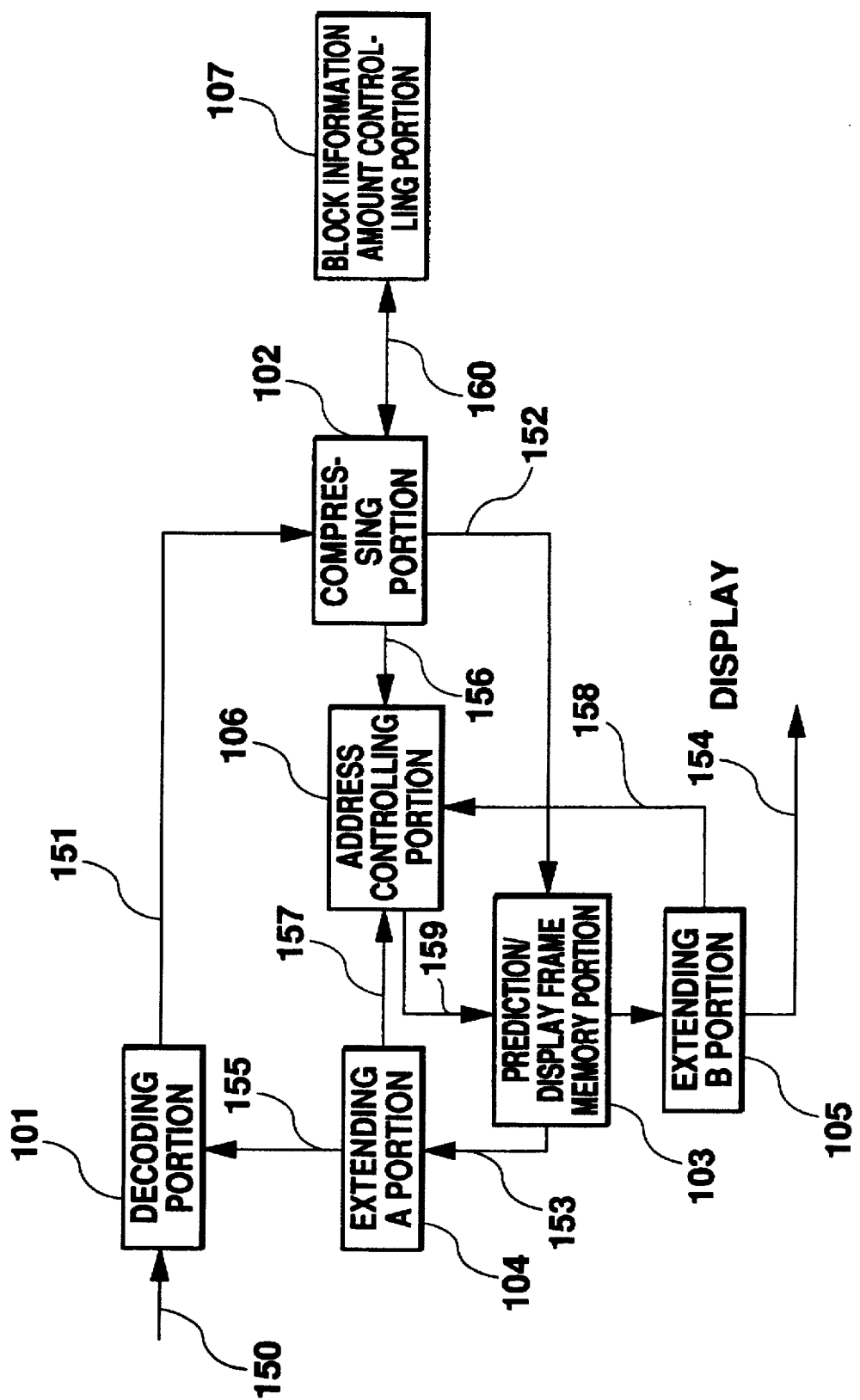
FIG. 9 is a block diagram showing a general configuration of the present invention in a second embodiment.

FIG. 9 is block diagram showing a general configuration of a second embodiment of the present invention. The coding process is identical to that in the first embodiment described above and its explanation is omitted here. The present embodiment is characterized in that a block data amount controlling portion 107 is connected to the compressing portion 102 through a controlling line 160. For each image to be compressed, the block data amount controlling portion 107 monitors the data amount after compression processing in the compressing portion 102 to ensure that the data amount is less than a predetermined maximum value U. If the data amount is above the predetermined maximum value U, the compressing portion 102 is instructed to change the compressing rate and recompress. Since the data amount for 1 block of compressed image data is adjusted within a range which does not exceed the maximum permitted value U, the address controlling portion 106 stores the addresses of the prediction/display frame memory portion 103 in which the data for each block has been written. Decompression of the compressed data is then carried out in compliance with these addresses at the decompressing A portion 104 and the decompressing B portion 105.

As in the first embodiment, the prediction/display frame memory portion 103 can be configured with a capacity less than the data amount of the target image data because the stored data is compressed.

Moreover, by appropriately altering the compressing rate to match the data amount after compressing, as in the case of an image which is small originally compared to the memory capacity, image deterioration can be limited without much compressing.

Figure 10:
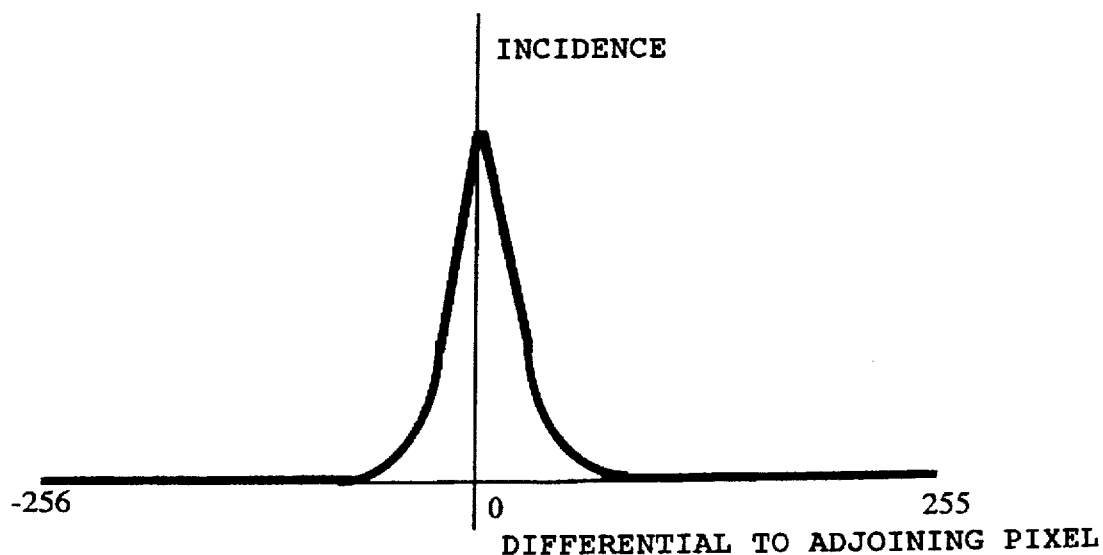
FIG. 10 is a diagram showing the relation between differential coded data of adjoining pixels of image data and incidence.
Figure 11:
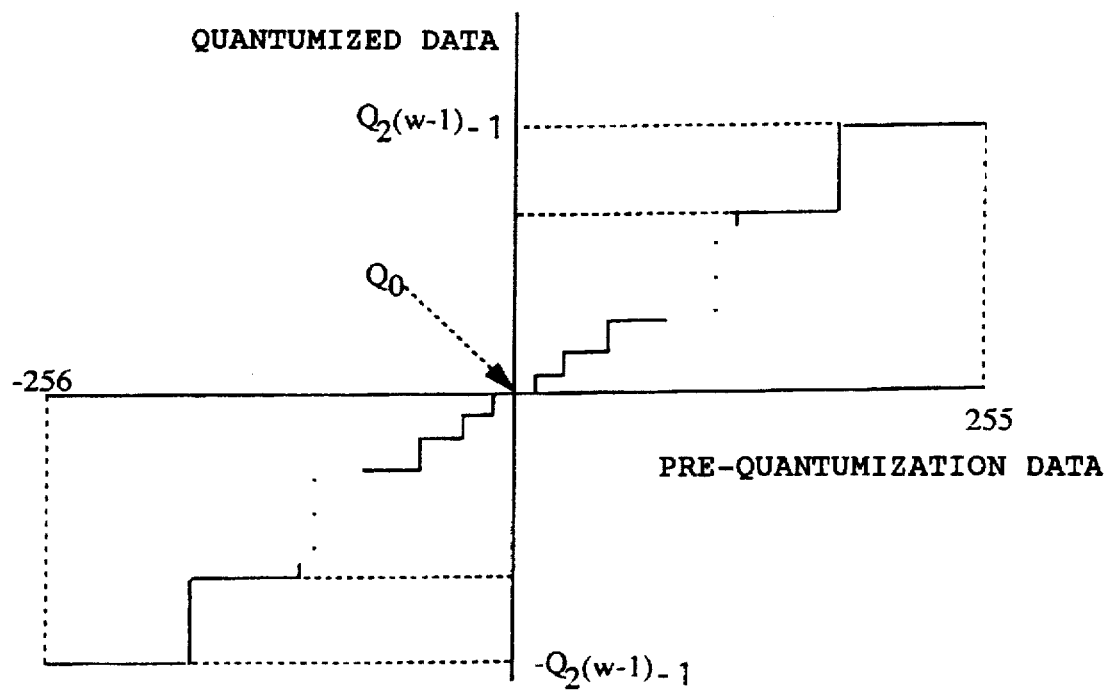
FIG. 11 is a diagram explaining the quantumization of differential coded data in the second embodiment.

The following explains the changes to the compressing rate. FIG. 10 is a graph showing an example of the incidence of differences in the coded data of adjoining pixels of image data. Since image data between adjoining pixels are usually extremely similar having only small differences, as the diagram shows the curve is concentrated around the point at which the difference is zero and decreases sharply as the difference becomes larger. Then, at higher values of the absolute value of the difference, the curve becomes practically zero. In consideration of this characteristic, a short word-length is allocated when the differences of the image data (the differences of the coded data) are close to zero, and a long word-length is allocated as the difference becomes larger. Such allocation is termed Huffman coding, an example of which is shown in FIG. 11. When such allocating is carried out, near zero the data amount decreases due to the short word-length and since incidence here is high, the data amount of the entire block is also reduced.

The compressing portion 102 first compresses the decoded data according to the above-mentioned Huffman coding, and the block data amount controlling portion 107 judges whether or not this data amount is less than the maximum value U. If the data amount is less than the predetermined maximum value U, further quantizing is not carried out. Since in the above-mentioned Huffman coding differences of the coded data are merely being substituted, no image deterioration is caused. Thus, in this case, no image deterioration is caused.

If the data amount of the data compressed according to Huffman coding is greater than the maximum permitted value, further compressing is carried out by a method such as according to the equations (1) and (2) described in the first embodiment. In the first embodiment differences of the coded data were quantizing using 4 bits, but, in the present embodiment the block data amount controlling portion 107 determines a quantizing bit number w which will ensure that the data amount after compressing is less than the maximum permitted value, and quantizing is carried out at the compressing portion 102 based on this quantizing bit number. An example of the data before and after being quantized in this quantizing processing is shown in FIG. 12. As FIG. 12 shows, in a case where quantizing is carried out with 4 bits, a resulting quantizing of $(2^{(w-1)}1)*2+1$ is carried out. In other words, for image data which has a large data amount the bit number w is decreased and the compressing range is widened, and for data having a small data amount the bit number w is increased and the compressing range is narrowed to control image deterioration due to compressing.

Embodiment 3

Figure 13:
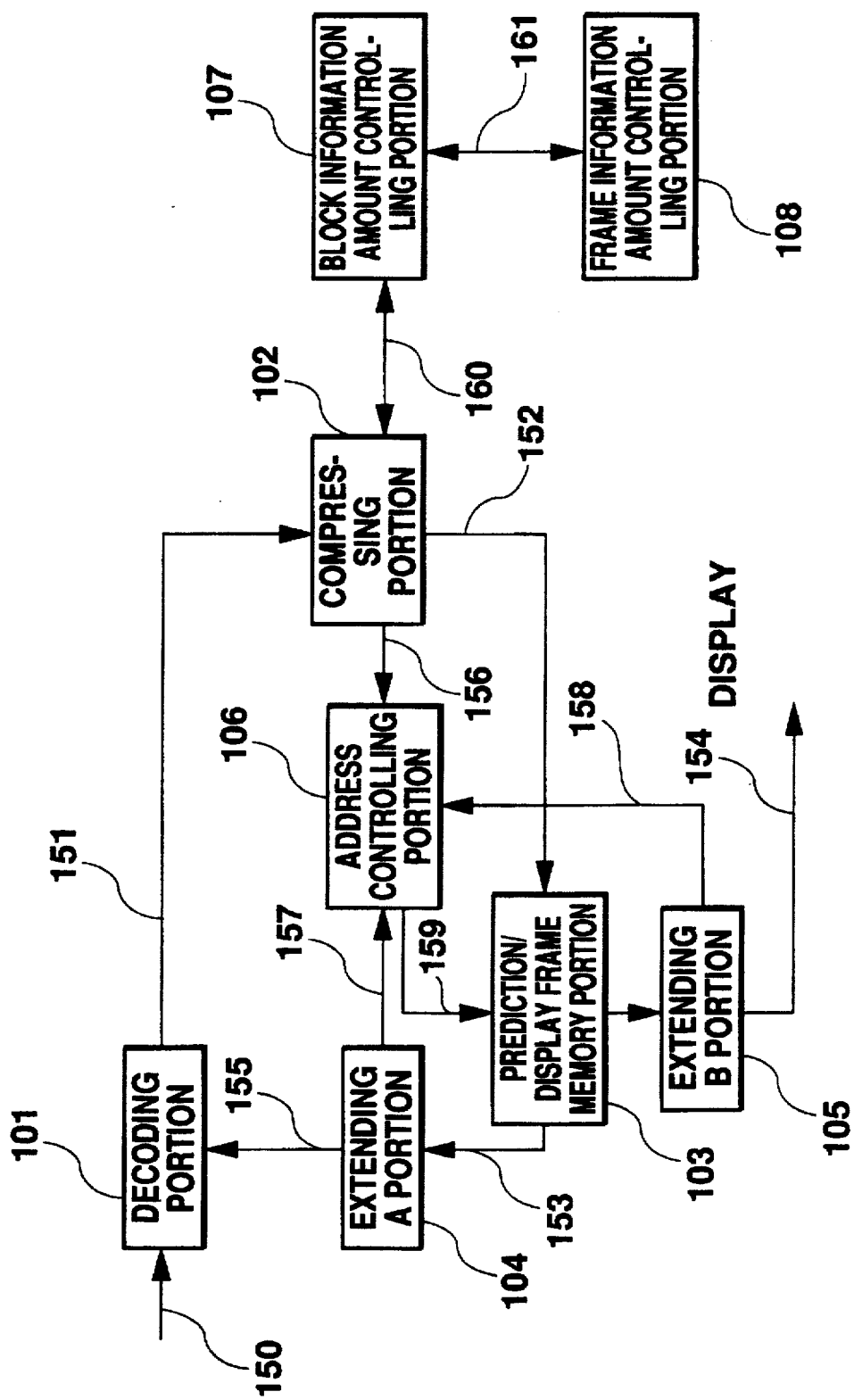
FIG. 13 is a block diagram showing a third embodiment of the present invention.

FIG. 13 is a general block diagram showing a general configuration of a third embodiment of the present invention. The coding process is identical to that in the first and second embodiments and its explanation is omitted here. The present embodiment is the same as the second embodiment but is characterized in that a frame data amount controlling portion 108 has been provided. The frame data amount controlling portion 108 is connected to the block data amount controlling portion 107 through a controlling line 161. The frame data amount controlling portion 108 monitors the data amount of each frame after compression processing to ensure that the data amount for each frame is less than a predetermined frame value S. If the data amount is above the predetermined frame amounts, the compressing portion 102 is instructed to change the compressing rate and recompress. Since the data amount for 1 block of compressed image data is adjusted in response to the image, the address controlling portion 106 stores the addresses of the prediction/display frame memory portion 103 in which the data for each block has been written. Decompression of the compressed data is then carried out in compliance with these addresses at the decompressing A portion 104 and the decompressing B portion 105.

Figure 14:
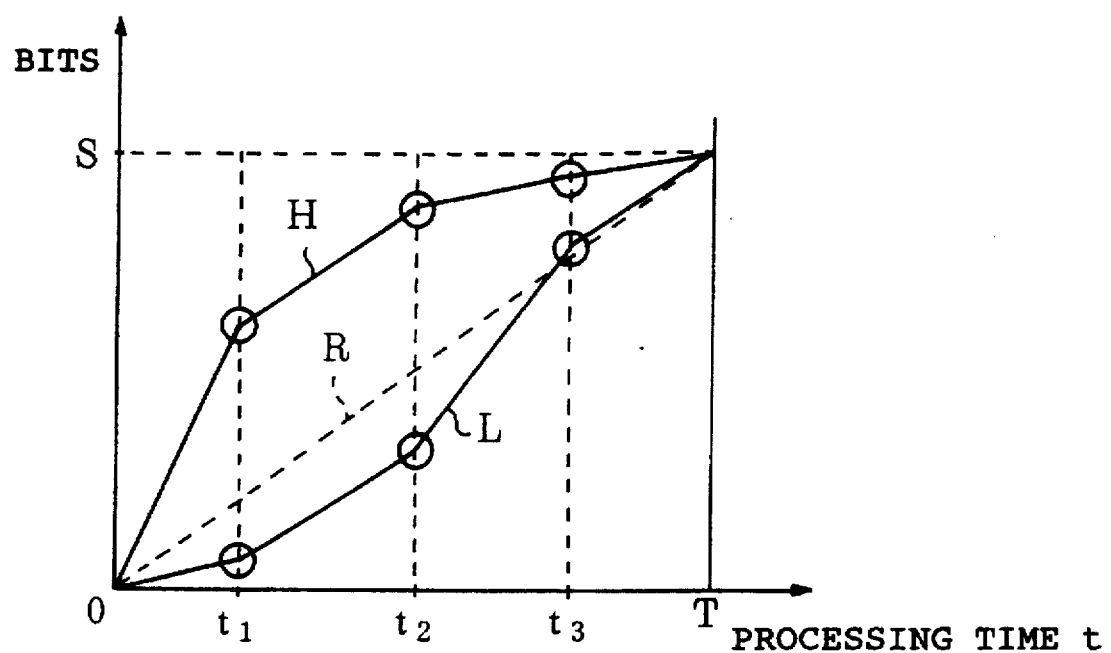
FIG. 14 is a diagram explaining the monitoring of an data amount in the third embodiment.
Figure 15:
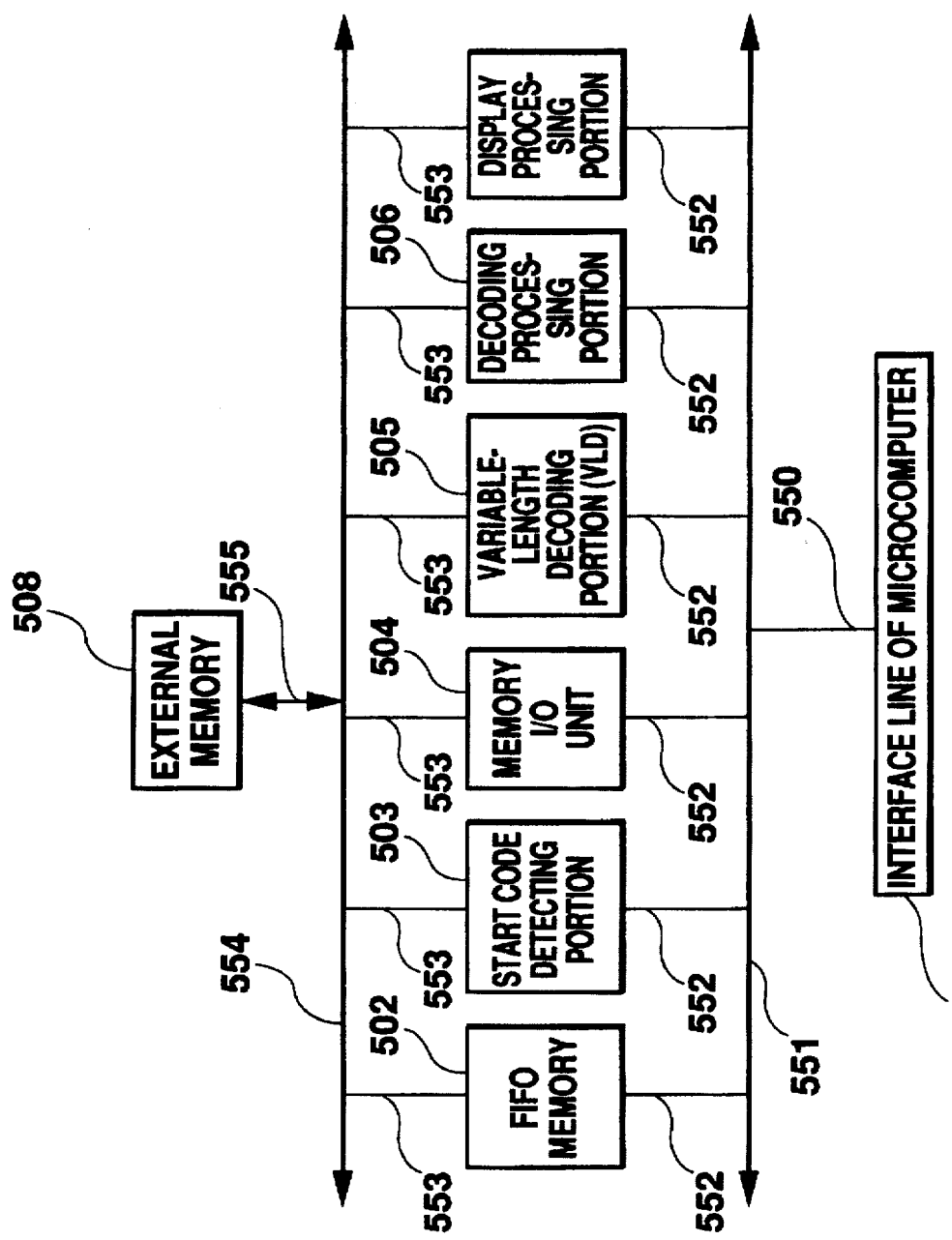
FIG. 15 is a block diagram depicting the configuration of a prior art example.
Figure 16:
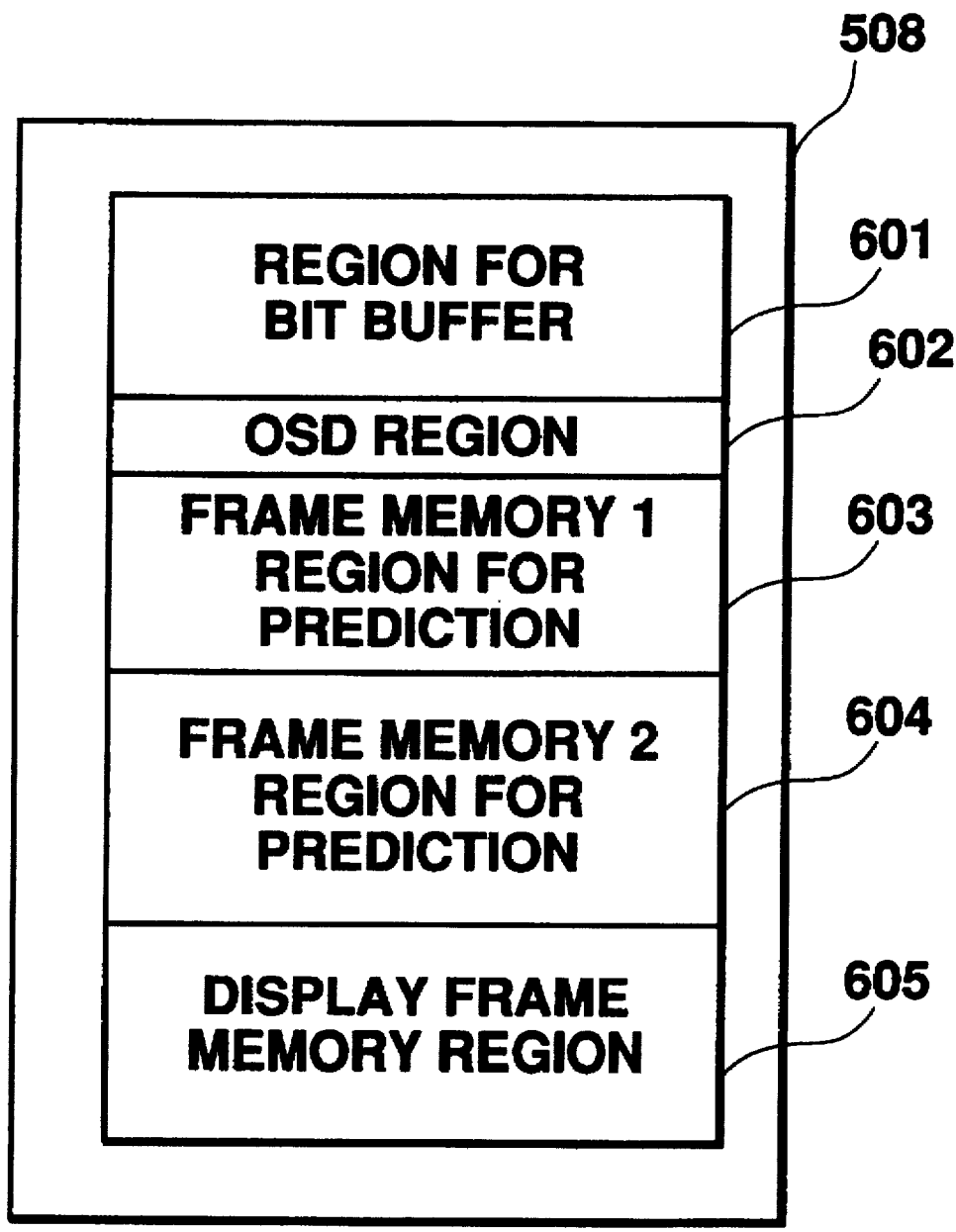
FIG. 16 is a diagram depicting a frame memory bit map of a prior art example.

FIG. 14 will be used to explain the operation of the data amount controlling portion 108. The horizontal axis indicates the time required for compressing processing, a block is sequentially compressed in raster sequence, and the processing of 1 frame is completed in a time T. The vertical axis indicates the information amount after compressing, and the predetermined maximum information value for 1 image frame is the frame value S bits. The frame value S is determined according to the capacity of the prediction/display frame memory portion 103. If the data amount of compressed image data increases proportional to the number of blocks for which compressing processing has been completed, that is, if it increases along the dashed line R in the center of the diagram, the data amount attains its maximum permitted value when the processing of 1 frame is completed.

However, depending on the image which is to be compressed, the image quality of certain images can be maintained even after substantial compressing, while there are other images which must be compressed as little as possible to maintain the image quality. At a predetermined point during the processing of 1 frame, the frame data amount controlling portion 108 compares the data amount generated up to that point with the proportionally increasing standard value R and executes an instruction to alter the compressing rate to ensure that the data amount at the point of completion of the processing of 1 frame will attain the maximum permitted value S. For instance, if the amount of information compressed by a time $t_1$ as indicated by the graph line H is large in comparison with the standard value R, in the subsequent processing an instruction is executed to alter the compressing rate so that more substantial compressing is carried out. Alternatively, if the amount of information compressed by a time $t_1$ as indicated by the graph line L is small in comparison with the standard value R, in the subsequent processing an instruction is executed to alter the compressing rate so that less substantial compressing is carried out.

Alteration of the compressing rate is carried out as follows. As in the second embodiment, Huffman coding is first applied to the decoded data at the compressing portion 102. Then, at a designated time $t_1$ the total of the data amount of the blocks processed up to that time is compared with the standard value R. Then, as described above, judgment is made with regard to the alteration of the subsequent compressing rate based on this comparison. In a case where it has been judged that alteration of the compressing rate is necessary, the frame data amount controlling portion 108 sends an instruction to the block data amount controlling portion 107 to alter the maximum permitted value U of the data amount for 1 block. Alteration of the compressing rate to match this maximum permitted value U is carried out at the compressing portion 102 and compressing processing is effected. The operation of the compressing portion 102 can be the same type as that in the second embodiment. Moreover, when the predetermined times $t_2$ and $t_3$ are reached, comparison between the standard value R and the data amount up to these points can be carried out once again, suitability is judged as mentioned above and alteration is carried out as required. The number of comparisons carried out is not restricted to 3 times and other values can also be taken. Furthermore, the time for carrying out the comparison is not restricted to those shown here and can be altered to another predetermined time. For instance, in the initial stage of processing 1 frame the frequency can be increased and the distinctive qualities of the image being processed can be speedily identified and control of the subsequent compressing rate can be carried out based on this. In addition, the compressing rate at the initial stage of the compressing processing can be determined with reference to the information relating to the previously processed frame.

Other Embodiments

In each of the embodiments described above, image data decoded by the decoding portion 101 was compressed and sent to the prediction/display frame memory portion 103, but it is also acceptable to write data which are not compressed in a display memory region. In such a case, the decompressing B portion 105 would not be necessary and the display image would not suffer deterioration due to compressing processing.

Moreover, in the third embodiment, the compressing rate of the compressing portion 102 is altered by altering the maximum permitted value U of the data amount for 1 block as determined by the block data amount controlling portion 107. However, the configuration is not restricted, and a configuration is also acceptable wherein, for instance, the frame data amount controlling portion 108 directly sends an instruction for the quantizing bit number w and alters the compressing rate.

While there has been described what are at present considered to be preferred embodiments of the invention, it will be understood that various modifications may be made to the present invention and it is intended that the appended claims cover all such modifications as fall within the true spirit and scope of the invention.

What is claimed is:

1. A digital image decoding apparatus, said apparatus comprising:

a decoding circuit for decoding inter-frame coded image coded data at a block unit and obtaining decoded data;

a compressing circuits for compressing the block unit decoded data obtained by the decoding circuits and obtaining compressed data;

a prediction frame memory for storing at least one image frame of block unit compressed data obtained by the compressing circuits;

a decompressing circuits for decompressing the compressed data which has been stored in the prediction frame memory; and an address controlling circuits for controlling the writing of the compressed data to the prediction frame memory and the reading of the compressed data from the prediction frame memory.

2. A digital image decoding apparatus according to claim 1, further comprising a display frame memory for storing at least one image frame of block unit compressed data obtained by the compressing circuits, said image frame to be used for display only.

3. A digital image decoding apparatus according to claim 1, wherein the compressing circuits deems one of the pixels which constitute the block as a standard pixel and first quantizes the data of the standard pixel, and then quantizes pixels other than the standard pixel based on the differences of the coded data of positionally adjoining pixels.

4. A digital image decoding apparatus according to claim 1, wherein the compressing circuits selects one standard pixel from each pixel row of the block, and first quantizes the data of the standard pixel, and then quantizes pixels other than the standard pixel based on the differences of the coded data of adjoining pixels within the pixel row to which the pixels belong.

5. A digital image decoding apparatus according to claim 1, wherein the compressing circuits allocates a small amount of information to a high frequency signal and allocates a large amount of information to a low frequency signal when compressing.

6. A digital image decoding apparatus according to claim 1, further comprising a block data amount controlling circuits for controlling the compressing rate to ensure that the data amount of each block which has been compressed by the compressing circuits will be less than a predetermined data amount.

7. A digital image decoding apparatus according to claim 6, wherein the compressing circuits compresses the data of each block, both by a first compressing method in which one of the pixels which constitute the block is deemed a standard pixel and the data of pixels other than the standard pixel are expressed as differences of the coded data between adjoining pixels, and a short word-length is allocated for these differences of the coded data when the differences are close to zero and a long word-length is allocated for the differences which are larger, and by a second compressing method in which one of the pixels which constitute the block is deemed a standard pixel and first the data of the standard pixel is quantized, and then the data of pixels other than the standard pixel are quantized, with a predetermined quantization bit number, based on the differences of the coded data of adjoining pixels; and a block data amount controlling circuits operates such that, if the data amount of the data which have been compressed by the first compressing method of the compressing circuit is less than a predetermined value, an instruction is sent to the compressing circuits to output the data resulting from the first compressing method and, if the data amount of the data which have been compressed by the first compressing method is greater than the predetermined value, the block data amount controlling circuits chooses a quantization bit number to ensure that the data amount will be less than the predetermined value, and sends an instruction to the compressing means to compress the data resulting from the second compressing method using this chosen quantization bit number.

8. A digital image decoding apparatus according to claim 6, wherein the compressing circuits compresses the data of each block, both by a first compressing method in which one of the pixels which constitute the block is deemed a standard pixel and the data of pixels other than the standard pixel are expressed as differences of the coded data between adjoining pixels, and a short word-length is allocated for these differences of the coded data when the differences are close to zero and a long word-length is allocated for differences which are larger, and by a second compressing method in which one pixel in each of the pixel rows of the block is deemed a standard pixel and first, the data of the standard pixel is quantized, and then the data of pixels other than the standard pixel are quantized, with a predetermined quantization bit number, based on the differences of the coded data of adjoining pixels within the pixel row to which the pixel belongs; and the block data amount controlling circuits operates such that, if the data amount of the data which have been compressed by the first compressing method of the compressing circuit is less than the predetermined value, an instruction is sent to the compressing circuits to output the data resulting from the first compressing method and, if the data amount of the data which have been compressed by the first compressing method is greater than the predetermined value, the block data amount controlling means chooses a quantization bit number to ensure that the data amount will be less than the predetermined data amount, and sends an instruction to the compressing circuits to compress the data resulting from the second compressing method using the chosen quantization bit number.

9. A digital image decoding apparatus according to claim 1, further comprising a frame data amount controlling circuit for controlling the compressing rate to ensure that the data amount of each frame which has been compressed by the compressing circuits will be less than a predetermined image frame data amount.

10. A digital image decoding apparatus according to claim 9, wherein the frame data amount controlling circuits compares the total data amount at a predetermined time during the compression operation of one image frame, with a standard data amount at the predetermined time, and operates such that, if the total data amount has exceeded the standard data amount, the maximum permitted data amount value of each block in the subsequent compressing is set to a lower value, and, if the total data amount is less than the standard data amount, the maximum permitted data amount value of each block in the subsequent compressing is set to a higher value.

11. A digital image decoding apparatus according to claim 10, wherein the apparatus also has a block data amount controlling circuits for controlling the compressing rate to ensure that the data amount of each block compressed by the compressing circuits is less than a predetermined data amount; and wherein the compressing means compresses the data of each block both by a first compressing method in which one of the pixels which constitute the block is deemed a standard pixel and the data of pixels other than the standard pixel are expressed as differences of the coded data between adjoining pixels, and a short word-length is allocated for these differences of the coded data when the differences are close to zero and a long word-length is allocated for the differences which are larger, and by a second compressing method in which one pixel in each of the pixel rows of the block is deemed a standard pixel and first, the data of the standard pixel is quantized, and then the data of pixels other than the standard pixel are quantized, with a predetermined quantization bit number, based on the differences of the coded data of adjoining pixels within the pixel row to which the pixel belongs.

12. A digital image decoding apparatus according to claim 10, wherein the apparatus also has a block data amount controlling circuits for controlling the compressing rate to ensure that the data amount of each block compressed by the compressing circuits is less than a predetermined data amount; and wherein the compressing means compresses the data of each block both by a first compressing method in which one of the pixels which constitute the block is deemed a standard pixel and the data of pixels other than the standard pixel are expressed as differences of the coded data between adjoining pixels, and a short word-length is allocated for these differences of the coded data when the differences are close to zero and a long word-length is allocated for the differences which are larger, and by a second compressing method in which one pixel in each of the pixel rows of the block is deemed a standard pixel and first, the data of the standard pixel is quantized, and then the data of pixels other than the standard pixel are quantized, with a predetermined quantization bit number, based on the differences of the coded data of adjoining pixels within the pixel row to which the pixel belongs; and the block data amount controlling circuit operates such that, if the data amount of the data which have been compressed by the first compressing method of the compressing circuits is less than the maximum permitted value set by the frame data amount controlling circuit, the block data amount controlling circuits sends an instruction to the compressing circuit to output the data resulting from the first compressing method, and, if the data amount of the data which have been compressed by the first compressing method is greater than the maximum permitted value set by the frame data amount controlling circuit, the block data amount controlling circuits chooses a quantization bit number to ensure that the data amount will be less than the maximum permitted value set by the frame data amount controlling circuit, and sends an instruction to the compressing circuits to compress the data resulting from the second compressing method using the chosen quantization bit number.

* * * * *